(No Model.)

R. HARRINGTON.
LOCK NUT.

No. 267,423.  Patented Nov. 14, 1882.

Witnesses.
C. J. Williamson
Wm. L. Speiden.

Inventor.
Roland Harrington
by John J. Halsted & Son
Atty's.

UNITED STATES PATENT OFFICE.

ROLAND HARRINGTON, OF WOLVERHAMPTON, ENGLAND.

LOCK-NUT.

SPECIFICATION forming part of Letters Patent No. 267,423, dated November 14, 1882.

Application filed August 31, 1882. (No model.) Patented in England February 16, 1882, No. 763.

*To all whom it may concern:*

Be it known that I, ROLAND HARRINGTON, of Wolverhampton, England, have invented a new and useful Improved Lock-Nut, (for which I have obtained a patent in Great Britain, bearing date 16th February, A. D. 1882, No. 763,) of which the following is a specification.

My invention relates to nuts of a simple and inexpensive construction, and has for its object to prevent said nuts from working loose on the thread of the screw-bolt upon which they are placed.

To this end the invention consists in constructing nuts by rolling, coiling, or otherwise forming them out of or from a strip or piece of spring-steel, steel wire, or other suitable elastic material of convenient shape, into a spiral or convolved form. For this purpose I use strips of spring-steel rolled or fashioned with a knife or V edge on one (the inner) side, so that when the strip is coiled up the knife-edges form the thread of the nut. Sometimes I construct the nut by pressing or stamping a washer or blank ring of suitable shape, having a knife or V edge on its inner circumference, from or out of a strip of spring-steel or other suitable elastic material, and cutting the same completely through one part of its circumferential border, so that by pulling or forcing apart the two ends formed by the cut an elastic nut consisting of one thread is formed. In either case I make the pitch of the thread of the nut slightly finer or coarser than that of the bolt on which it is to be screwed, the inner circumference of the nut being preferably made slightly smaller than the circumference of the screw, so that on screwing up these nuts—which may be made of any convenient depth in one or more pieces, or consist of a series of single-threaded pieces—the coil forming the nut will grip the bolt or screw to which it is applied. The outer peripheries of the nuts may be squared or made into hexagons or any other form for convenience of screwing up or adjustment.

The accompanying drawings will serve to illustrate a convenient mode of performing the invention, like letters of reference representing like parts.

Figure 1:
Figure 2:
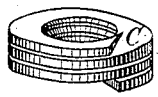
Figure 4:
Figure 3:
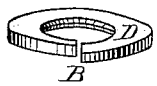
Figure 5:
Figure 6:

Figure 1 is a perspective view of a knife-edged blank, A, ready for coiling. Fig. 2 is a perspective view of the same when coiled and formed into a nut. Fig. 3 is a perspective view of a washer or single-threaded nut, D, B being the cut above referred to. Fig. 4 is a cross-section of the blank A. Fig. 5 is a cross-section through the nut as shown in Fig. 2. Fig. 6 is a cross section through Fig. 3 before the ends are sprung open.

Having thus described my invention, what I claim is—

1. An improved elastic and gripping lock-nut made from a strip or piece of elastic material, having a knife-like or V edge, and shaped into a spiral having one or more coils, the V-edge being on the inner side of the coil or spiral, substantially as shown and described.

2. The improved lock-nut, composed of a series of pieces of elastic material, each of which is shaped into an open single-thread spiral, having a V or knife edge on its inner edge, substantially as shown and described.

In testimony whereof I have signed this specification in the presence of two subscribing witnesses.

ROLAND HARRINGTON.

Witnesses:
ARTHUR PROCTER,
JOHN FEGAN.